March 29, 1960 — E. E. HOPKINS — 2,930,515
RIPPING MACHINE FOR ELECTRIC CORD
Filed May 21, 1957 — 2 Sheets-Sheet 1

Inventor:
Earl E. Hopkins
by Richard L. Caslin
Allard A. Braddock
His Attorneys

March 29, 1960     E. E. HOPKINS     2,930,515
RIPPING MACHINE FOR ELECTRIC CORD
Filed May 21, 1957     2 Sheets-Sheet 2
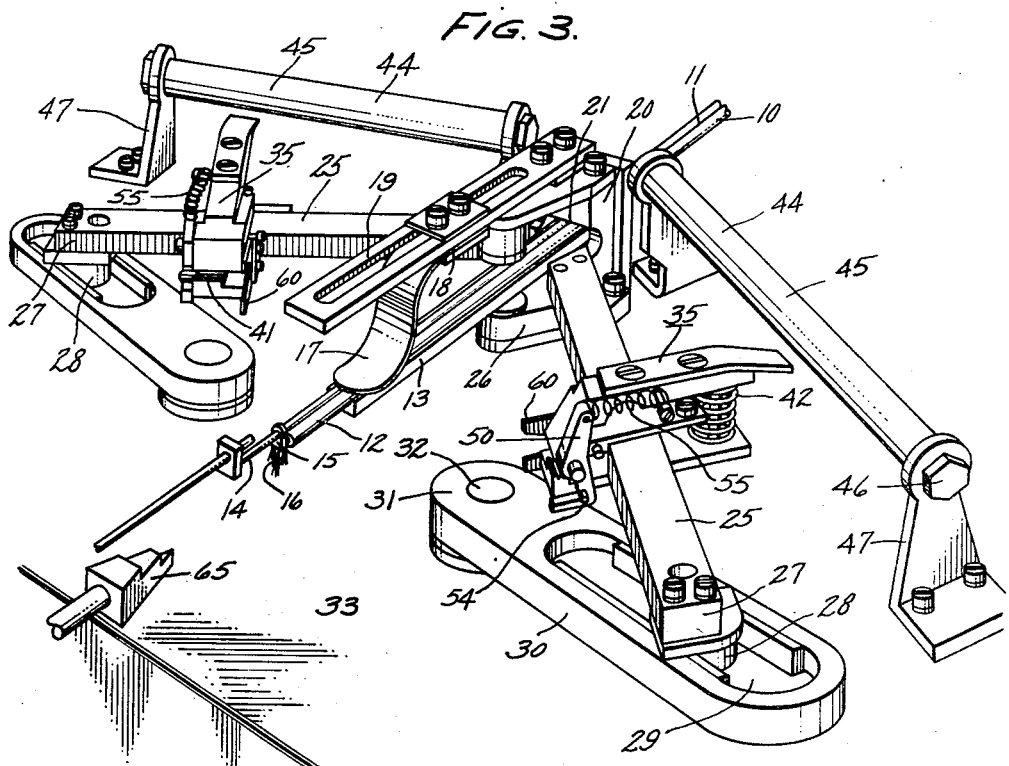
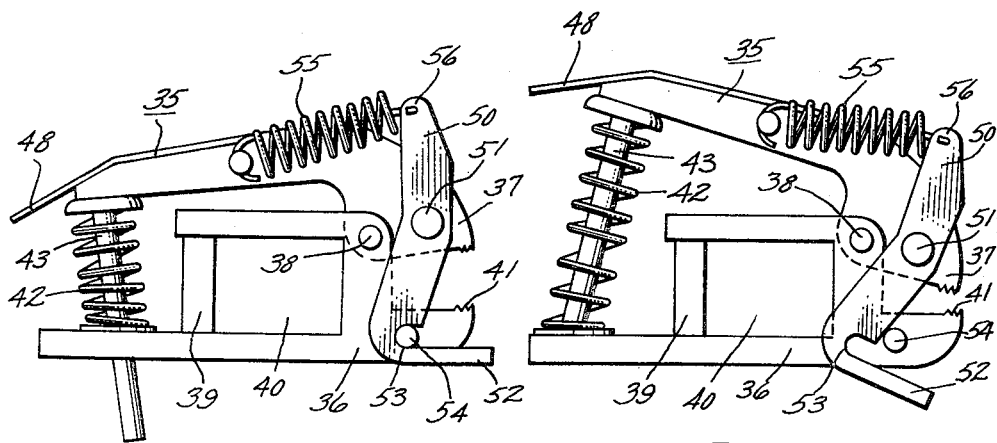
Inventor:
Earl E. Hopkins
by Richard L Caslin
Albert A. Braddock
His Attorneys

United States Patent Office 2,930,515
Patented Mar. 29, 1960

2,930,515

RIPPING MACHINE FOR ELECTRIC CORD

Earl E. Hopkins, Schenectady, N.Y., assignor to General Electric Company, a corporation of New York Application May 21, 1957, Serial No. 660,653

6 Claims. (Cl. 225—101)

This invention relates to a method and machine for ripping one end of an electric cord so that the individual conductors of the cord may be separated and provided with terminal clips for connection to an appliance such as a room air conditioner.

This machine was specifically designed to be used in ripping a three conductor rip cord as is shown in the Mapelsden et al. Patent No. 2,729,696, which is assigned to the same assignee as is the present invention. This cord is flat with three parallel conductors, the two outer conductors being circuit conductors while the center conductor is a grounding conductor. A ripping groove is located in the insulation of the cord above and below the center conductor. It is necessary to separate the three conductors at the end of the cord for about six to eight inches. This may be accomplished by pulling the two circuit conductors apart, thereby exposing the grounding conductor. While this machine was specifically designed to process three conductor rip cord, it should be recognized that it is also adaptable to a rip cord construction having only two conductors.

When the three conductor rip cord of the Mapelsden et al. patent was first produced, the three conductors were separated by hand. An operator with a pair of pliers in each hand would grip the opposite sides of the cord and tear through the ripping grooves of the cord until the desired length of the cord was separated. This operation seemed simple in and of itself, but when it was multiplied by the thousands of cordsets that were being processed per week, it became a tedious task.

The principal object of this invention is to provide a machine capable of ripping the end of an electric cord to separate the individual conductors from each other for as much as 8 inches.

A further object of this invention is to provide a ripping machine for an electric cord which is capable of gripping the opposite sides of the cord at one end to separate the conductors, and then automatically release the cord to complete the cycle of operation.

The machine of this invention comprises a work table supporting a similar pair of pivoted arms which move in a horizontal plane. Both arms are pivoted about a common axis to swing between two extreme positions. The opposite end of the arms includes a vertically supported roller that slides in an elongated slot of a separate driven lever. The two levers are driven in unison to swing the arms between a closed and an open spread apart position. Each arm carries a pair of inwardly-turned gripping jaws which are normally spring-biased to a closed position. A stop bar or roller is provided for each arm and is located adjacent the arm when the arm is in the spread apart or open position. As the end of the cord is ripped apart and the arms approach the fully open position, the jaws will be engaged by the stop bars and forced open to release the cord. A spring-biased latch is provided with each pair of jaws to hold the jaws in the open position after the jaws are opened by striking the stop bar. Once the swinging arms are brought together, the two latch members will be tripped as they strike each other, thereby permitting the jaws to close about the opposite side edges of a cord that is held therebetween. A wedge block is forced between the two driven levers when the arms are in their fully closed positions to increase the initial tearing force exerted on the cord by suddenly spreading the arms apart.

My invention will be better understood from the following description taken in connection with the accompanying drawings and its scope will be pointed out in the appended claims.

Figure 3 is an isometric view of the ripping machine of Figures 1 and 2 showing the pivoted arms in an intermediate position moving toward the closed position.

Figure 4 is a side elevational view of a pair of gripping jaws of the type that is mounted on both of the pivoted arms of the machine. The jaws are shown held in their fully opened position by a spring-biased latch member.

Figure 5 is a side elevational view similar to that of Figure 4 showing the latch member after it has been tripped with the jaws in the closed position.

Figure 1:
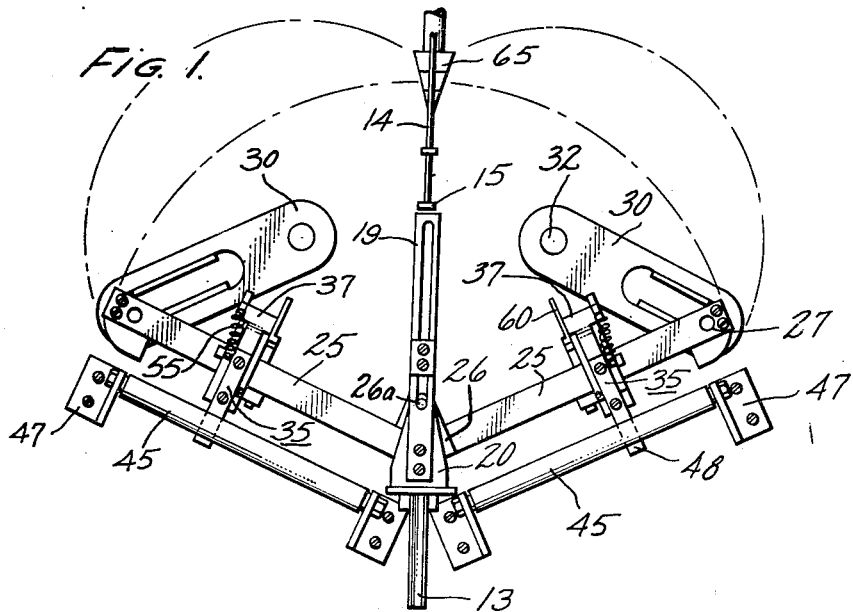
Figure 1 is a top plan view of a ripping machine according to my invention with the pair of pivoted arms in their fully spread apart position, which is the starting position of the machine.

Referring in detail to the drawings, and in particular to the isometric view of Figure 3, there is shown a short length of three conductor rip cord 10 with three parallel conductors 16 that lie in a common plane as is shown in the Mapelsden et al. Patent No. 2,729,696. Ripping grooves 11 are disposed above and below the center conductor before the cord is ready to be processed by this machine, it is necessary to strip the insulation back about one inch from all three conductors 16. The cord is also cut to the desired length whether it be four feet, six feet or possibly eight feet in length.

The grooves are to be torn open for approximately six to eight inches at the end 12 of the cord. The cord 10 is fed into the machine from the upper right-hand corner of Figure 3 by sliding it into a trough 13 until the end of the cord 12 extends beyond the trough for approximately three inches. This provides space for gripping the opposite sides of the cord and pulling them apart. A push rod 14 with a stop plate 15 at its end is placed in the path of the cord. As the cord strikes the plate a microswitch (not shown) will be actuated to start the machine in operation.

It is necessary to press the cord 10 down near the end of the trough 13 so that when the cord strikes the push rod 14, the cord will not fold back on itself and fail to actuate the micro-switch. This force is provided by an S-shaped spring blade 17 that overlies the cord and is connected at its top end 18 to an extension plate 19 supported from a standard 20. This standard 20 has a central opening 21 through which one end of the trough 13 extends.

The main elements of this machine are a pair of pivotally mounted arms 25, both having a common pivotal axis 26a at perpendicular end portion 26. Looking at Figure 3, the left-hand arm 25 is pivotally mounted above the trough 13 about a vertical axis, while the right-hand arm 25 is pivotally mounted below the trough about the same vertical axis. The swinging end 27 of each arm has a roller 28 that is capable of turning about a vertical axis and confined within an elongated slot 29 of a pivoted lever 30. Each lever 30 is pivoted about one end 31 on a vertical pin 32 that extends through the work table 33 of the machine. The actual drive motors, air cylinders, racks, and gear trains that are assembled below the work table 33 are not shown in detail since they follow conventional machine design practices and are not strictly a part of the present invention. It is believed sufficient to say that the two pivoted levers 30 are symmetrically arranged on opposite sides of the cord 10 and driven in unison to swing the arms 25 between two extreme positions, namely, the open position of Figure 1 and the closed position of Figure 2.

Each swinging arm 25 carries a pair of inwardly facing gripping jaws 35 which are shown in detail in Figures 4 and 5. Each pair of gripping jaws comprises a fixed jaw 36 and a movable jaw 37 pivotally mounted thereon about pin 38. The fixed jaw contains a sleeve 39 having a rectangular shaped opening 40 for sliding engagement on the arm 25. A set screw (not shown) holds the fixed jaw 36 from sliding on the arm 25. Both jaws 36 and 37 have serrated teeth 41 for gripping the top and bottom of one side of the cord 10. These jaws are normally biased closed by a coil spring 42 that is braced between the handle portions of the jaws remote from the gripping teeth 41. A guide rod 43 is fixed at one end to the movable jaw 37 and extends through the spring 42 and an opening in the handle portion of the fixed jaw 36 to prevent the spring from becoming disengaged from the jaws.

The jaws 36 and 37 are normally closed by the spring 42 so they will be clamped on the cord 10. After the cord is ripped, however, it is necessary to disengage the jaws so that the cord may be released. This function is accomplished by a stop bar or roller 45 that is located generally parallel to each arm 25 when the arms are in their fully open position. The roller 45 consists of a sleeve 44 that is loosely mounted on a shaft 46 that is in turn supported between a pair of angle brackets 47. The top surface of the handle portion of the movable jaw 37 has a downwardly inclined track 48 which slides under the roller 45 as the arm 25 swings open with the jaws 35 being in their normal closed position. In so doing, the spring 42 is compressed and the jaws are opened.

It is necessary to hold the jaws 35 open as the arms 25 swing closed; otherwise, the jaws would not be able to grip the opposite sides of the cord 10. This need is satisfied by a pivoted latch 50, shown in Figure 4, of generally L-shaped that moves at its center about the pivot pin 51 on the movable jaw 37, and has a lower end 52 with a socket 53 for receiving the lock pin 54 of the fixed jaw 36. A coil spring 55 is connected between the upper end 56 of the latch and the handle portion of the movable jaw 37 to normally bias the latch in a counterclockwise direction so that once the jaws are fully opened, the latch member will automatically engage the lock pin 54 and hold the jaws open. The lower portions 52 of the latches 50 of the two pairs of jaws 35 are extended beyond the ends of the jaws when the jaws are in the open position shown in Figure 4. This is done so that when the two arms 25 swing together, the lower ends 52 of the latches will strike each other and move about their pivots against the action of their tension coil springs 55. In so doing, each latch will become disengaged from the lock pin 54 and the jaws 36 and 37 will suddenly clamp the opposite sides of the cord 10. A bifurcated plate 60 shown in Figure 3 is assembled to the side of each pair of jaws 35 opposite the latch 50 to serve as a guiding and supporting member for the end 12 of the cord to insure that the cord is in the proper position as the jaws clamped shut.

Figure 2:
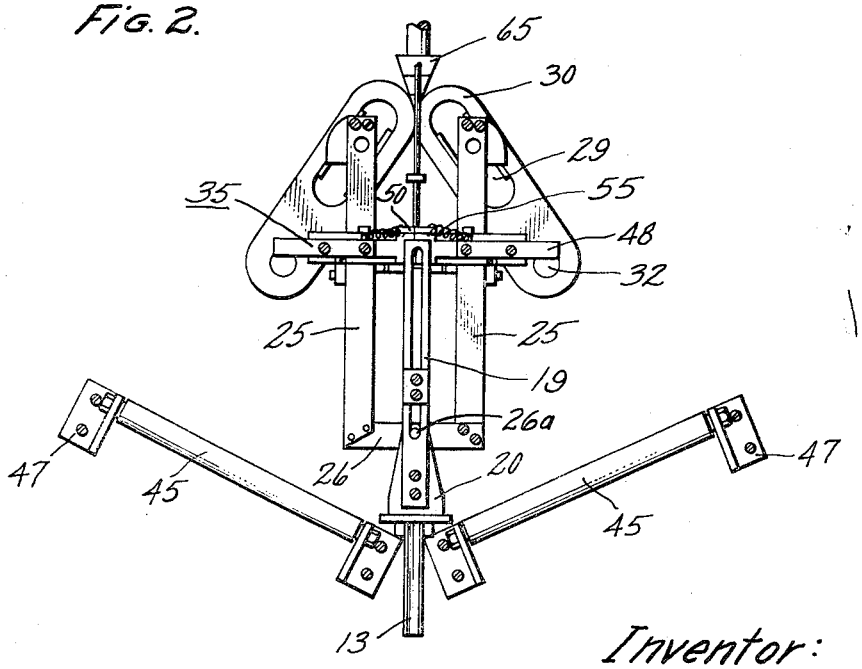
Figure 2 is a similar top plan view of a ripping machine embodying my invention where the pivoted arms have been moved to their extreme closed position so the gripping jaws will engage the end of the cord on the opposite side edges thereof.

When the jaws 35 are gripping the opposite sides of the cord 10 as shown in Figure 2, the free ends of the driven levers 30 are nearly in engagement with each other. At this time, it is necessary to spread the arms 25 apart but this can only be done if the cord is split at the ripping grooves 11. A maximum amount of force is needed to initiate the tear or rip in the cord. Once a tear is started, it is a simple matter to continue the tearing operation. Figure 3 shows a movable wedge block 65 which is forced between the free ends of the levers 30 when the arms 25 are in their closed position of Figure 2 to start the tearing operation of the cord. The wedge block 65 not only separates the levers 30, but it in turn separates the arms 25 and jaws 35, thereby tearing the cord in half. As the arms 25 continue their swing to the open position of Figure 1, the split sides of the cord are pulled from under the spring blade 17. When the arms approach the stop rollers 45, the movable jaws 37 will ride under the rollers and compress the springs 42 and release the cord. Simultaneously, the latch 50 will automatically engage the lock pin 54 and hold the jaws in this open position.

Having described above my invention of a novel ripping machine for an electric cord, it will be readily apparent to those skilled in this art that this machine will save a great deal of time and manual labor in separating the insulated conductors of the cord. This machine has been designed to incorporate the least number of moving parts and to simulate the motions of a human operator in ripping the end of the cord. It is a quick-acting, heavy duty machine that is capable of withstanding much abuse for long periods of time without a breakdown.

Modifications of this invention will occur to those skilled in this art, and it is to be understood, therefore, that this invention is not limited to the particular embodiment disclosed, but that it is intended to cover all modifications which are within the true spirit and scope of this invention.

What I claim as new and desire to secure by Letters Patent of the United States is:

1. A ripping machine for electric cord comprising a pair of swinging arms movable in unison in a single plane between an open and a closed position, each arm of said pair carrying a set of cord-gripping jaws, said sets of gripping jaws being oppositely disposed to each other and facing inwardly toward each other when said arms are in said closed position, spring means normally biasing said gripping jaws of each pair towards each other, thereby to grip opposite sides of a cord when said arms are in a closed position, stop means adjacent to each of said arms when said pair of arms is in the open position, said stop means arranged to engage one jaw of each pair of said jaws when said arms are swung to the open position thereby to open said jaws and disengage said jaws from said cord, latching means for holding said jaws of each pair in their open position upon the opening thereof, and unlatching means for releasing said latching means when said arms move to said closed position, thereby to allow said spring means to close said gripping jaws about said cord.

2. A ripping machine for electric cord as recited in claim 1 wherein the pair of arms pivot about a common axis, and each set of jaws comprises one fixed and one movable jaw, the movable jaw being spring biased to a normally closed position by said spring means, the said stop means comprising a member that forces the movable jaw to an open position against the action of the spring means, said latching means of each set comprising a movable latch carried by the movable jaw and engageable with a locking pin on the fixed jaw.

3. A ripping machine as recited in claim 2 wherein said unlatching means comprise outward extensions of said latches that engage each other as the swinging arms are brought together so that said latches will be tripped automatically to allow said jaws to close with a snap action to grip the opposite sides of the electric cord.

4. A ripping machine for electric cord comprising a pair of arms, each of said arms pivotally mounted at one end to move in a plane common to the other arm, a pair of pivoted levers, the opposite end of each arm having a sliding connection with a separate one of said levers for swinging the arm between two extreme at-rest positions, one position being a closed position where the two arms are brought in close proximity, the second position being an open position where the arms are spread apart, a pair of inwardly-facing cord-gripping jaws mounted on each arm, each pair of said jaws having spring means normally biasing them into a closed position thereby to grip opposite sides of a cord when said arms are in said closed position, stop means engageable by one jaw of each pair of said jaws as the arms approach the open position thereby to force the jaws to release said cord, a spring-biased latch for each pair of said jaws for holding the jaws open once said cord is released, and unlatching means comprising engaging extensions on said latches for releasing each said latch when said arms move to the closed position thereby to allow said spring means to close said gripping jaws over the opposite sides of a cord that is positioned therebetween.

5. A ripping machine for electric cord comprising a cord supporting trough, a pair of pivoted arms located respectively on each of the opposite sides of said trough, each arm being pivoted about one end on a common axis that extends vertically through said trough, a pair of driven levers each having an elongated slot therein, one of said levers arranged to drive each of said arms, the end of each arm remote from said axis carrying a guide roller that engages the elongated slot of its associated driven lever thereby to be driven between an open and a closed position, each arm supporting a pair of inwardly turned cord-gripping jaws, one jaw of each pair being fixed while the other is movable, the movable jaw being normally spring-biased to a closed position, each pair of said jaws arranged to grippingly engage one side of said cord when said arms are in the closed position, a stop bar mounted adjacent each arm when the arms are in their open position, said movable jaws engaging said bars and thereupon moving away from the fixed jaws to release the cord when said arms move to their open position, and automatic latching means carried by each said movable jaw to hold each pair of jaws in the open position when said movable jaw has moved away from said fixed jaw.

6. A ripping machine for electric cord as recited in claim 5 wherein a portion of said cord extends outwardly from said trough, and the latching means carried by each movable jaw includes an outward extension, said outward extension of each latching means engaging said extension of the other latching means thereby to disengage each latching means when the two arms are brought to the closed position so as to close each pair of jaws around one side of said portion of said cord.

References Cited in the file of this patent

UNITED STATES PATENTS

| 1,180,364 | Allatt | Apr. 25, 1916 |
| 1,925,884 | Steele | Sept. 5, 1933 |
| 2,289,161 | Zalkind | July 7, 1942 |
| 2,427,515 | Swain | Sept. 16, 1947 |
| 2,579,835 | Lather | Dec. 25, 1951 |
| 2,711,793 | Zalkind | June 28, 1955 |
| 2,761,505 | Greiner et al. | Sept. 4, 1956 |
| 2,761,506 | Rutkus et al. | Sept. 4, 1956 |